United States Patent [19]
Abboud et al.

[11] Patent Number: 5,979,503
[45] Date of Patent: Nov. 9, 1999

[54] ABS MODULATOR SOLENOID WITH A PRESSURE BALANCING PISTON

[75] Inventors: Pierre Abboud, Fairlawn; Thanh Ho, Brunswick, both of Ohio

[73] Assignee: AlliedSignal Truck Brake Systems, Co., Elyria, Ohio

[21] Appl. No.: 08/917,073

[22] Filed: Aug. 22, 1997

[51] Int. Cl.[6] .............................................. F15B 13/044
[52] U.S. Cl. ................................ 137/627.5; 137/596.17
[58] Field of Search ............................ 137/596.17, 627.5

[56] References Cited

U.S. PATENT DOCUMENTS

| | | | |
|---|---|---|---|
| 4,773,447 | 9/1988 | Imanaka et al. | 137/627.5 |
| 5,067,524 | 11/1991 | Pickenhahn | 137/627.5 |
| 5,154,203 | 10/1992 | Krause, et al. | |
| 5,771,933 | 6/1998 | Akamatsu et al. | 137/627.5 |

FOREIGN PATENT DOCUMENTS

3111716 A1   10/1982   Germany .

OTHER PUBLICATIONS

"M–21 and M–22 Antilock Modulator Assembly" from AlliedSignal Bendix Catalog SD–13–4793, dated May 1995, pp. 1–8.

*Primary Examiner*—Gerald A. Michalsky

[57] ABSTRACT

An ABS modulator solenoid valve (10), having one electric solenoid (12), in which the valve control piston (14) has a passage (16) therethrough for balancing the pneumatic pressure on both ends (34, 36) of the control piston (14). One end (34) of the piston (14) is disposed in a closed piston chamber (32) while the other end (36) is positioned to contact and position a valve spool (40). The passage (16) extends between the ends (34, 36) of the piston (14). Piston (14) is biased by a spring (50) to a position within the piston chamber (32). When the solenoid (12) is de-energized the piston (14) remains in this position and variable air pressure, from an operator controlled brake valve (126), can be supplied through the valve (10) to a brake chamber (128) for operating the vehicle service brakes. During an ABS application the solenoid (12) is energized to overcome the inlet spring (50) bias and the piston (14) moves into engagement with the valve spool (40). The spool (40) is biased by an exhaust spring (52) to a position wherein the exhaust port (24) is isolated from the supply port (20) and the delivery port (22). When the solenoid (12) is fully energized the piston (14) engages the spool (40) and moves it to the exhaust position. When the solenoid is energized with a selected hold current the piston (14) engage but not move the spool (40) and the valve (10) is then in a hold position. Since the pressure on the ends (34, 36) of the piston (14) is balanced the force required to move the piston (14) to the hold position is relatively constant and not greatly effected by the pneumatic pressure at the supply port (20) or the delivery port (22).

2 Claims, 5 Drawing Sheets

ABS MODULATOR SOLENOID WITH A PRESSURE BALANCING PISTON

BACKGROUND OF THE INVENTION

1. Field of the Invention

This invention relates to a pneumatic ABS system and more particularly to a unique ABS modulator solenoid valve, with a pressure balancing piston, which includes the build, hold and exhaust functions.

2. Description of Prior Art

In heavy vehicle air brake systems a brake valve controlled by the vehicle operator supplies compressed air at a pressure of 10 psi to 120 psi for operating the vehicle service brakes. During braking the air is supplied through the brake valve to brake chambers for operating the service brakes. The pressure of the air supplied to the service brakes is a function of the position of the brake valve which is controlled by the vehicle operator.

Standard practice in the pneumatic ABS industry is to use a modulator between the brake valve and the brake chambers for controlling the air supplied to the brake chambers. Normally the modulator has two separate control circuits using solenoids, one for building pressure in the brake chambers and one for exhausting pressurized air from the brake chambers. The hold function is also accomplished with these two circuits. During the hold function the modulator holds or regulates the air pressure in the brake chambers to a pressure between 0 psi and the pressure supplied by the brake valve. The pressure supplied by the brake valve can vary from 10 psi to 120 psi.

The AlliedSignal M-21 and M-22 antilock system modulators are exemplary of prior art ABS modulators. These modulators are essentially high capacity, on/off air valves that incorporate a pair of electrical solenoids for control. The solenoids provide the electro-pneumatic interface or link between the antilock controller electronics and the air brake system. The modulator includes a normally open exhaust solenoid and a normally closed supply solenoid, an inlet diaphragm valve and an exhaust diaphragm valve. During normal non-antilock operation both solenoids are de-energized. Brake application air enters the supply port and flows through the open exhaust solenoid to the exhaust diaphragm, which with a spring keeps the exhaust port closed. Simultaneously, application air flows to the supply diaphragm, forcing it away from its seat and permitting air flow out the delivery port to the service brake chambers. When the supply solenoid is energized the air flows therethrough closing the inlet diaphragm to prevent communication between the inlet or supply port and the outlet or delivery port. When the exhaust solenoid is energized air flow opens the exhaust diaphragm permitting free communication between the exhaust port and the delivery port for rapid exhaust of the compressed air in the brake chamber.

If a service brake application is made and the antilock system detects an impending wheel lockup, the antilock controller will immediately begin modification of the brake application using the modulator. In order to modify the brake application, the coils of the two solenoid valves contained in the modulator are energized or de-energized in a preprogrammed sequence by the antilock controller. The solenoids in the modulator are controlled independently by the antilock controller. When a solenoid is energized it either opens or closes thereby causing the exhaust or re-application of air pressure to the brake actuator.

In EBS systems it is know to use a proportional modulator valve with a single solenoid for supplying compressed air at various pressures to the vehicle brake chambers. Compressed air at a set pressure, usually 120 psi, is supplied to the valve inlet port and the pressure at the valve outlet port is controlled to vary directly with the current applied to the coil of the solenoid which controls the proportional modulator valve. U.S. Pat. No. 5,154,203 and German Offenlegungsschrift DE 3,111,716 A1 describe such proportional modulator valves.

SUMMARY OF THE INVENTION

The present invention is for an ABS modulator solenoid valve having one solenoid in which the valve control piston has a passage therethrough for balancing the pneumatic pressure on both ends of the control piston. This permits the ABS modulator solenoid valve to be maintained in the hold position when a selected relatively constant current is used to energize the solenoid coil. The selected current value can be constant or vary over a small range.

In the disclosed ABS modulator solenoid valve an electric solenoid is connected to move and move with the valve piston. One end of the piston is disposed in a piston chamber while the other end is positioned to contact and position a valve spool. A passage extends from the end of the piston, proximate to the spool, through the piston to the end of the piston disposed in the piston chamber for balancing the pressure on both ends of the piston. The piston is spring biased to a position within the piston chamber. When the solenoid is de-energized the piston remains in this position and service brake air pressure can be supplied through the valve for operating the vehicle service brakes. Service brake air pressure from brake valve varies from 10 psi to 120 psi. During an ABS application the solenoid is energized to overcome the piston spring bias and the piston moves out and into engagement with the valve spool. The spool is biased by an exhaust spring to a position wherein the exhaust port is isolated from the supply and delivery ports. When the solenoid is fully energized the piston engages the spool and moves it to the exhaust position wherein the air pressure in the brake chambers is vented to atmosphere through the solenoid valve. When the solenoid is energized with a selected hold current the piston moves out to engage but not move the spool and the valve is then in a hold position wherein the pressure in the brake chambers is held at a pressure less than the service brake pressure supplied to the valve inlet. The selected hold current for energizing the solenoid coil can be relatively constant or vary slightly within a small range because the pressure on both ends of the piston is balanced. Since the pressure on the ends of the piston is balanced the force required to move the piston to the hold position is relatively constant and not greatly effected by the pneumatic pressure at the supply port or the delivery port.

BRIEF DESCRIPTION OF DRAWINGS

For a better understanding of the invention reference may be had to the preferred embodiments exemplary of the inventions shown in the accompanying drawings in which.

DETAILED DESCRIPTION OF THE PREFERRED EMBODIMENTS

Figure 1:
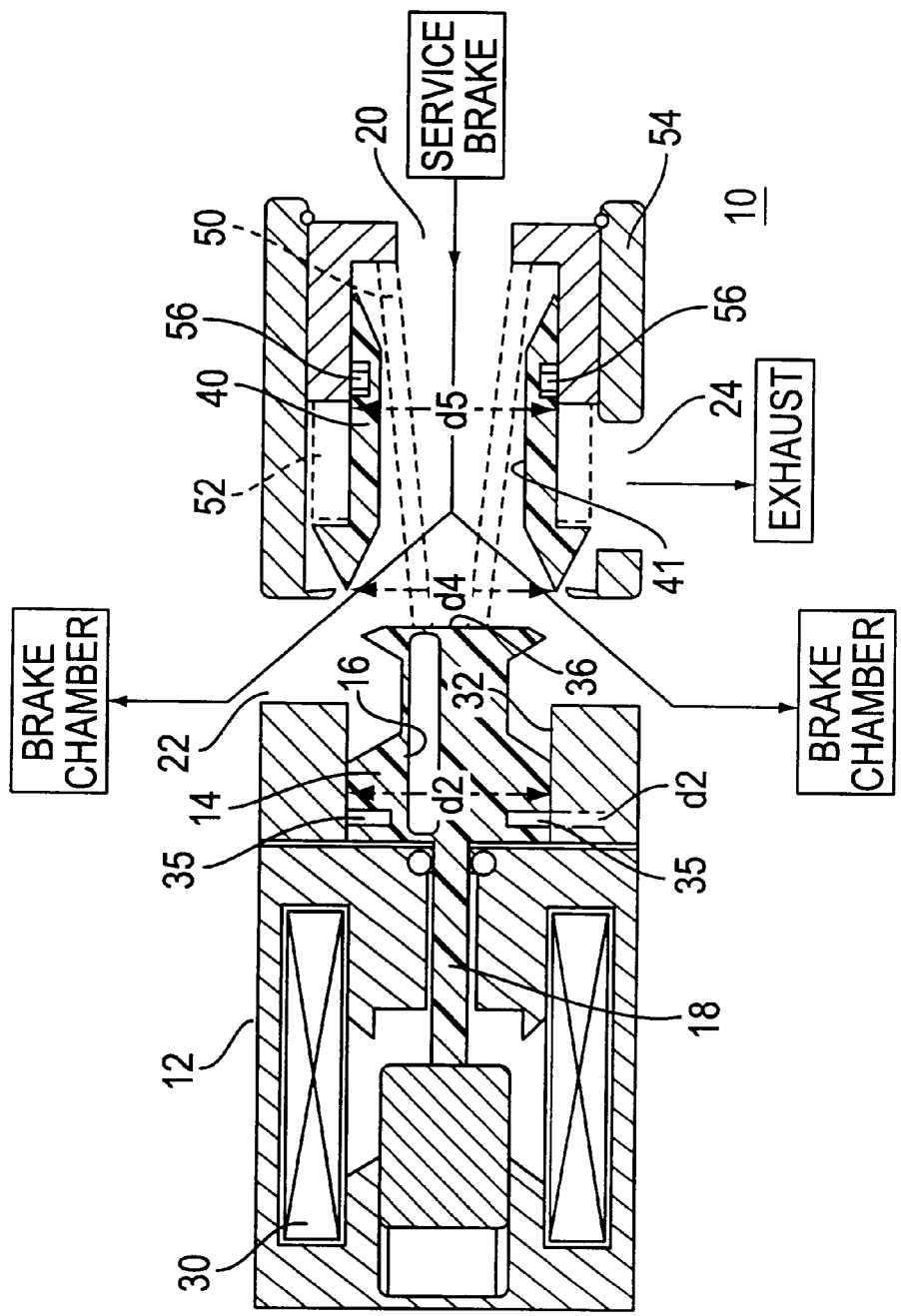
FIG. 1 is an illustration of a ABS modulator solenoid with a pressure balancing piston according to the present invention.

Referring now to the drawings and FIG. I in particular there is shown an improved ABS modulator solenoid valve 10, having one solenoid 12, in which a valve control piston 14 has a passage 16 therethrough for balancing the pneumatic pressure on both ends of the control piston 16. Modulator solenoid valve 10 can replace prior art modulator valves 110 as shown if FIG. 5 and which will be described below. Balancing the pressure on the ends of piston 14 permits a relatively constant force be required to keep the piston in a hold position.

Figure 5:
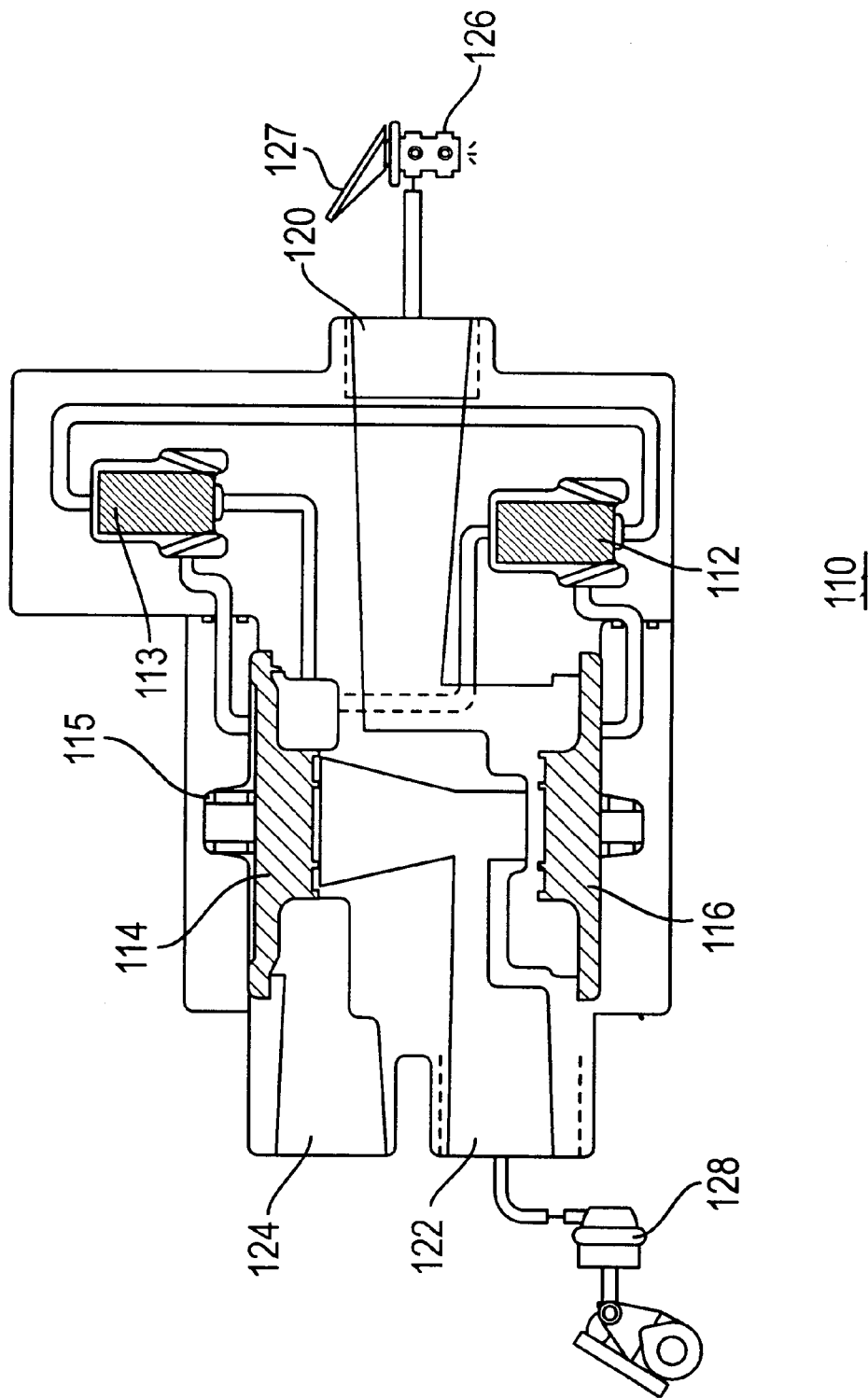
FIG. 5 shows a prior art two solenoid ABS modulator valve.

Referring now to FIG. 5 there is shown a prior art ABS modulator assembly 110. The modulator valve 110 is essentially a high capacity, on/off air valves that incorporate a pair of electrical solenoids 112, 113 for control. The solenoids 112, 113 provide the electro-pneumatic interface or link between the antilock controller electronics and the air brake system. The modulator 110 includes a normally open exhaust solenoid 113 and a normally closed supply solenoid 112, an inlet diaphragm valve and an exhaust diaphragm valve. During normal non-antilock operation both solenoids 112, 113 are de-energized. Brake application air, from a brake valve 126, enters the supply port or inlet port 120 and flows through the open exhaust solenoid 113 to the exhaust diaphragm 114, which with a spring 115 keeps the exhaust port 124 closed. Simultaneously, application air flows to the supply diaphragm 116, forcing it away from its seat and permitting air flow out the delivery port or outlet port 122 to the service brake chambers 128. When the supply solenoid 112 is energized the pressurized air flows therethrough closing the supply diaphragm 116 to prevent communication between the inlet or supply port 120 and the outlet or delivery port 122. When the exhaust solenoid 113 is energized air flow opens the exhaust diaphragm 114 permitting free communication between the exhaust port 124 and the delivery port 122 for rapid exhaust of the compressed air in the brake chamber 128.

If a service brake application is made and the antilock system detects an impending wheel lockup, the antilock controller will immediately begin modification of the brake application using the modulator 110. In order to modify the brake application, the coils of the two solenoid valves 112, 113 contained in the modulator 110 are energized or de-energized in a pre-programmed sequence by the antilock controller. The solenoids 112, 113 in the modulator 110 are controlled independently by the antilock controller. When a solenoid 112 or 113 is energized it either opens or closes thereby causing the exhaust or re-application of air pressure to the brake chamber 128 actuator.

Figure 2:
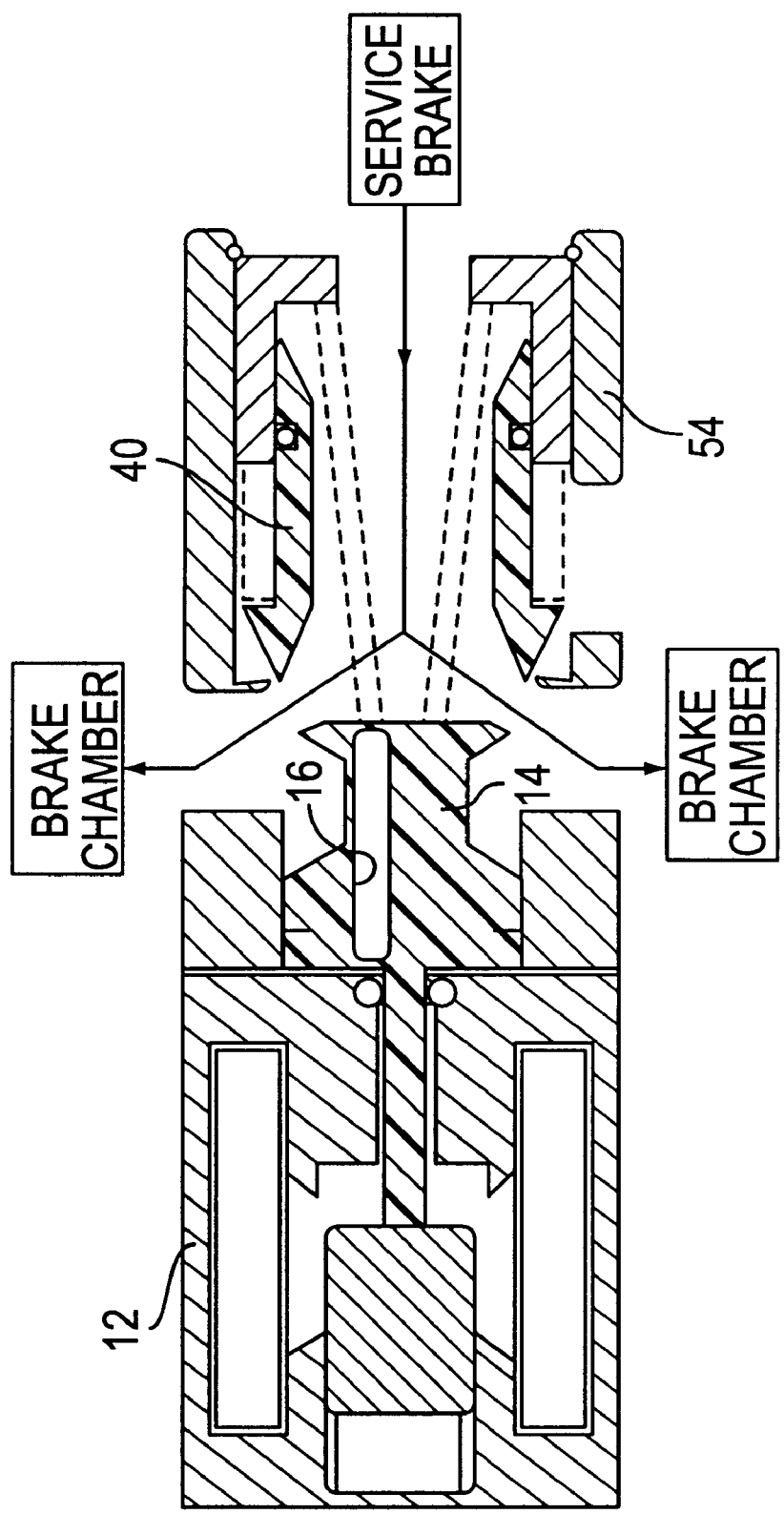
FIG. 2 is an illustration of an ABS modulator as shown in FIG. 1 in the pressure build position.
Figure 3:
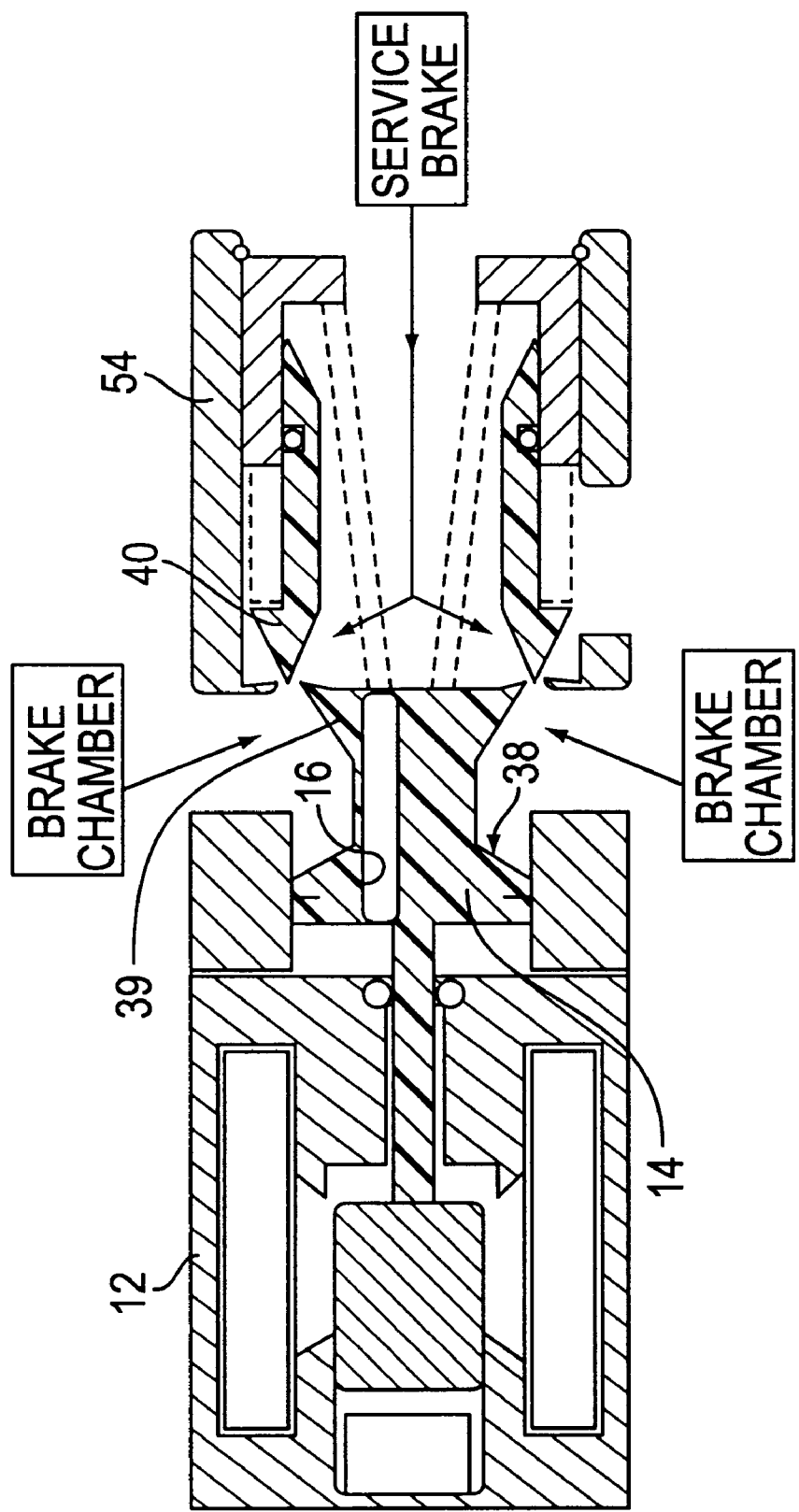
FIG. 3 is an illustration of an ABS modulator as shown in FIG. 1 in the pressure hold position.
Figure 4:
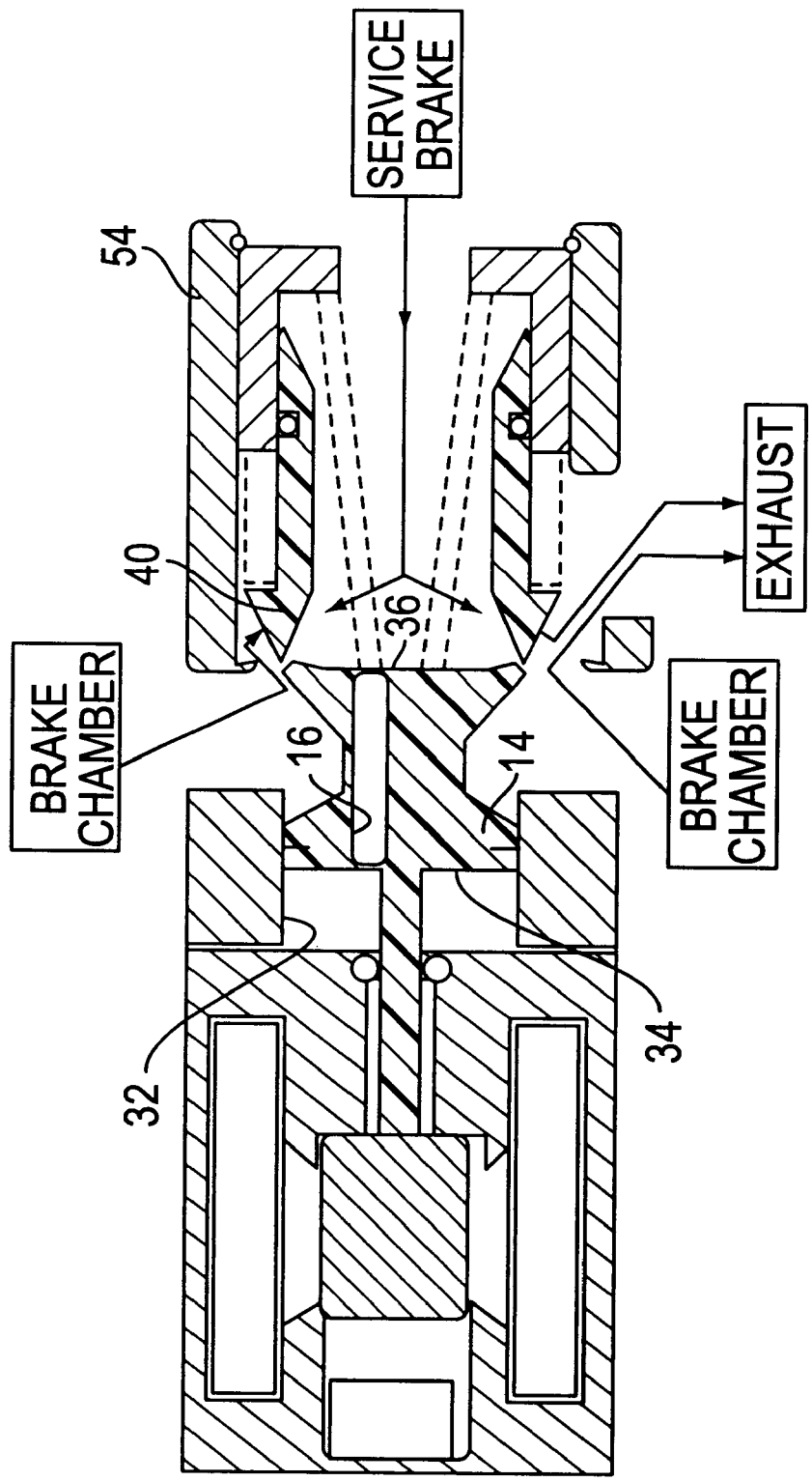
FIG. 4 is an illustration of an ABS modulator as shown in FIG. 1 in the exhaust position.

Referring now to FIGS. 1 to 4 the modulator valve 10 of FIG. 1 is shown in the build position in FIG. 2, in the hold position in FIG. 3 and in the exhaust position in FIG. 4. In the disclosed ABS modulator solenoid valve 10 an electric solenoid actuator 18 is connected to the valve piston 14. Actuator 18 moves in response to electric current applied to the coil 30 of solenoid in a manner well know in the art. Actuator 18 and piston 14 move together as a unitary part.

One end 34 of the piston 14 is disposed in a piston chamber 32 while the other end 36 is positioned to contact and position a valve spool 40. A passage extends from the end 36 of the piston 14, proximate to the spool 40, through the piston 14 to the end 34 disposed in the piston chamber 32 for balancing the pressure on both ends 34, 36 of the piston 14. A suitable seal such as a piston ring 35 is disposed around piston 14 in engagement with the walls of piston chamber 32 to isolate the closed end of piston chamber 32 from the delivery port 22.

The piston 14 is spring biased to a position, as shown in FIG. 2, within the piston chamber 32 by an inlet spring 50. When the solenoid 12 is de-energized the piston 14 remains in this position and service brake air pressure can be supplied through the solenoid valve 10 for operating the vehicle service brakes. Service brake air pressure from brake valve 126 varies from 10 psi to 120 psi. When the vehicle operator depresses a brake treadle 127 the brake valve 126 starts to supply air to brake chambers 128 through valve 10. The pneumatic pressure in the brake chambers 128 quickly builds to the pressure supplied from brake valve 126. When the brake treadle 127 is released and the ABS is not activated the pressure supplied from brake valve 126 drops to below 10 psi and the pressure in the brake chambers 128 also drops.

During an ABS application the solenoid coil 30 is energized with enough current to overcome the bias on piston 14 from spring 59 and piston 14 moves into engagement with the valve spool 40. The spool 40 is biased by an exhaust spring 52 to a position as shown in FIGS. 1 to 3 wherein the exhaust port 24 is isolated from the supply port 20 and the delivery port 22. Spool 40 is supported for longitudinal movement within a bore formed in housing 54. A suitable seal, such as O-ring 56 fits around spool 40 and isolates the supply port 20 from the exhaust port 24. One end of spool 40 engages a valve seat formed in housing 54 to isolate the delivery port 22 from the exhaust post 24.

When the coil 30 of solenoid 12 is fully energized the piston 14 engages the spool 14 and moves it to the exhaust position, as shown in FIG. 4, wherein the air pressure in the brake chambers 128 is vented to atmosphere through the solenoid valve 10. To move to this position the force supplied via solenoid actuator 18 must over come the force from inlet spring 50, exhaust spring 52 and the friction associated with the various components. When in the position shown in FIG. 4 the end 36 of piston 14 is in sealing engagement the end of spool 40 to prevent the supply port 20 from communicating with the delivery port 22 or the exhaust port 24. The brake chamber 128 is in free communication with the atmosphere through the delivery port 22 and the exhaust port 24. Any pressure within the brake chamber 128 is rapidly exhausted. The supply port 20, in this position, still communicates with the piston chamber 32, through passage 16, to balance the pneumatic forces on both end of piston 14.

When it is desired during ABS operation to neither build or exhaust the pressure to brake chambers 128 but to hold the pressure within brake chamber 128 the coil 30 of solenoid 12 is energized with a selected hold current which through actuator 18 causes piston 14 to engage but not move the spool 40 away from engagement with the valve seat formed in housing 54. The solenoid valve 10 is then in a hold position wherein the pressure in the brake chambers is held at the desired pressure which can be between 0 psi and the service brake pressure supplied to the valve inlet 20. If a service brake application is made and the antilock systems detects an impending wheel lockup, the antilock controller will immediately begin modification of the brake application using the modulator valve 10. In order to modify the brake application, the coil 30 of solenoid 12 is de-energized or energized to the hold or exhaust positions in a pre-programmed sequence by the antilock controller. In a typical ABS situation when wheel lockup is about to occur coil 30 is energized to fully extend piston 14 and move modulator valve 10 to the exhaust position, as shown in FIG. 4. The pressure in the brake chamber 128 then drops to approximately 0 psi. Modulator valve 10 is then modulated between the build pressure position, as shown in FIG. 2, and the hold pressure position, as shown in FIG. 3, to raise the pressure in brake chamber 128 in steps to the desired level. Depending on road surface conditions wheel lockup can occur at various service brake air pressures which are applied to the inlet port 20 and brake chambers 128. The service brake air pressure from brake valve 126 varies from 10 psi to 120 psi depending on the vehicle operators use of treadle 127. During an impending wheel lockup situation the ABS controller will control modulator valve 10 to modulate the pressure in brake chamber 128 to a pressure less than the pressure from brake valve 126 supplied to inlet port 20.

The selected hold current for energizing the solenoid coil 30 can be relatively constant or vary slightly within a small range because the pressure on both ends 34, 36 of the piston 14 is balanced. The out side areas of piston 14 are sized so when the pressures on the end 34, 36 of the piston 14 are equal the pressures from the brake chambers 128 acting on piston 14 cancel out and there is not net force tending to move piston 14 in any direction. Since the pressure on the ends 34, 36 of the piston 14 is balanced the force required to move the piston to the hold position is relatively constant and not greatly effected by the pneumatic pressure at the supply port 20 or the delivery port 22. Without considering friction the force required to maintain solenoid valve 10 in the hold position must be greater than the bias from inlet spring 50 but less than the combined bias from inlet spring 50 and exhaust spring 52.

We claim:

1. An ABS modulator valve comprising:

a housing having an inlet port, an outlet port, and an exhaust port;

a spool disposed within said housing and being spring biased to a position isolating said exhaust port from said inlet port and said outlet port, said spool having a diameter d5 at a seal isolating said inlet port from said exhaust port and a diameter d4 at a seal isolating said outlet port from said exhaust port, a piston biased to a first position having one end disposed within a sealed piston chamber with a diameter d2 at a seal against said chamber and having the other end disposed to engage and move said spool;

an electric solenoid attached to said housing having a connection to said piston for moving said piston when said electric solenoid is energized with a first selected current to a second position where it engages said spool, thereby isolating said inlet port, said outlet port, and said exhaust port, or with a second selected current to a third position where it engages and moves said spool to a position isolating said inlet port from said exhaust port and said outlet port, but allowing communication between said outlet port and said exhaust port; and a passage formed through said piston permitting free communication between said inlet port and said sealed piston chamber for balancing the pressures acting on said piston, wherein said diameters d2, d4, and d5 are substantially equal.

2. An ABS modulator valve as claimed in claim 1 comprising:

an opening through said spool through which said inlet port can communicate with said outlet port and said passage to said sealed piston chamber; and, sealing means for sealing the opening through said spool from communication with said outlet port when said piston engages said spool.

* * * * *